US011077864B2

(12) United States Patent
Ishisaka et al.

(10) Patent No.: US 11,077,864 B2
(45) Date of Patent: Aug. 3, 2021

(54) TRAVEL CONTROL APPARATUS, VEHICLE, TRAVEL CONTROL SYSTEM, TRAVEL CONTROL METHOD, AND STORAGE MEDIUM

(71) Applicant: HONDA MOTOR CO., LTD., Tokyo (JP)

(72) Inventors: Kentaro Ishisaka, Wako (JP); Takashi Watanabe, Wako (JP); Takafumi Hirose, Wako (JP); Takemi Tsukada, Wako (JP); Katsuya Yashiro, Wako (JP); Toru Kokaki, Wako (JP); Hisashi Matsuda, Wako (JP); Masaya Ikeda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 311 days.

(21) Appl. No.: 16/285,379

(22) Filed: Feb. 26, 2019

(65) Prior Publication Data

US 2019/0283774 A1 Sep. 19, 2019

(30) Foreign Application Priority Data

Mar. 13, 2018 (JP) ............................ JP2018-045814

(51) Int. Cl.
*B60W 50/12* (2012.01)
*G05D 1/02* (2020.01)
*B60W 40/08* (2012.01)

(52) U.S. Cl.
CPC ........... *B60W 50/12* (2013.01); *B60W 40/08* (2013.01); *G05D 1/021* (2013.01); *B60W 2040/0809* (2013.01); *G05D 2201/0213* (2013.01)

(58) Field of Classification Search
CPC ................ B60W 50/12; B60W 40/08; B60W 2040/0809; G05D 1/021; G05D 2201/0213; A63F 13/42; A63F 13/803; A63F 23/558; A63F 13/67
See application file for complete search history.

(56) References Cited

U.S. PATENT DOCUMENTS

2012/0215375 A1* 8/2012 Chang .................. B60W 50/08 701/1
2016/0055764 A1* 2/2016 Kujala .............. G06K 9/00845 434/66
2017/0088174 A1* 3/2017 Inoue ................. B60T 8/17557
2017/0313320 A1 11/2017 Asakura et al.
(Continued)

FOREIGN PATENT DOCUMENTS

JP 2013114603 A * 3/2000
JP 2017-197066 A 11/2017

*Primary Examiner* — Hunter B Lonsberry
*Assistant Examiner* — Elizabeth Yang
(74) *Attorney, Agent, or Firm* — Thomas | Horstemeyer, LLP

(57) ABSTRACT

A travel control apparatus controls automated driving travel of a vehicle by making a transition between a plurality of control states based on a surrounding environment of the vehicle. The travel control apparatus includes a skill level acquisition unit configured to acquire a skill level of a vehicle occupant about automated driving, and a control unit configured to control the automated driving travel of the vehicle in one of the plurality of control states based on the surrounding environment of the vehicle sensed by a sensing unit.

18 Claims, 7 Drawing Sheets

| SKILL LEVEL | SCORE OF VEHICLE OCCUPANT |
|---|---|
| A | $n3 \leq P$ |
| B | $n2 \leq P < n3$ |
| C | $n1 \leq P < n2$ |
| D | $0 \leq P < n1$ |

(56) References Cited

U.S. PATENT DOCUMENTS

| | | | | |
|---|---|---|---|---|
| 2017/0364070 | A1* | 12/2017 | Oba | B60K 28/066 |
| 2018/0032072 | A1* | 2/2018 | Hoye | B60W 40/08 |
| 2018/0322715 | A1* | 11/2018 | Toyoda | G08G 1/0112 |
| 2019/0049954 | A1* | 2/2019 | Mitchell | G05D 1/0297 |
| 2019/0344790 | A1* | 11/2019 | Kitagawa | G05D 1/0061 |
| 2020/0086886 | A1* | 3/2020 | Kaneko | B60W 40/02 |
| 2020/0139992 | A1* | 5/2020 | Oba | B60W 50/14 |

* cited by examiner

100
COM
COMPUTER
CPU
SKILL LEVEL ACQUISITION UNIT
CONTROL UNIT
MEMORY
COMMUNICATION DEVICE
C1
C11
C12
C2
C3
RD
INPUT UNIT
DISP
DISPLAY DEVICE
UI
OPERATING UNIT
NET
SV
T
CAM
CAMERA
MON
IN-VEHICLE MONITORING CAMERA
S
SENSOR
RADAR
LIDAR
GYRO SENSOR
GPS SENSOR
VEHICLE SPEED SENSOR
BIOLOGICAL INFORMATION SENSOR
GRIP SENSOR
S1
S2
S3
S4
S5
S6
S7

FIG. 2

| SKILL LEVEL | SCORE OF VEHICLE OCCUPANT |
|---|---|
| A | $n3 \le P$ |
| B | $n2 \le P < n3$ |
| C | $n1 \le P < n2$ |
| D | $0 \le P < n1$ |

FIG. 3

| SKILL LEVEL | ACHIEVEMENT RATIO OF REQUESTED TASK |
|---|---|
| A | $r3 \le R$ |
| B | $r2 \le R < r3$ |
| C | $r1 \le R < r2$ |
| D | $0 \le R < r1$ |

FIG. 4

| SKILL LEVEL | FREQUENCY OF REQUESTED TASK |
|---|---|
| A | $0 \le F < f1$ |
| B | $f1 \le F < f2$ |
| C | $f2 \le F < f3$ |
| D | $f3 \le F$ |

FIG. 6

| USER ID | AUTHENTICATION INFORMATION | SKILL LEVEL |
|---|---|---|
| aa | Aut 1 | A |
| bb | Aut 2 | B |
| cc | Aut 3 | C |
| dd | Aut 4 | D |

TRAVEL CONTROL APPARATUS, VEHICLE, TRAVEL CONTROL SYSTEM, TRAVEL CONTROL METHOD, AND STORAGE MEDIUM

CROSS-REFERENCE TO RELATED APPLICATION(S)

This application claims priority to and the benefit of Japanese Patent Application No. 2018-045814 filed on Mar. 13, 2018, the entire disclosure of which is incorporated herein by reference.

BACKGROUND OF THE INVENTION

Field of the Invention

The present invention relates to a travel control apparatus, a vehicle, a travel control system, a travel control method, and a storage medium, specifically to a travel control technology of an automated driving vehicle.

Description of the Related Art

In recent years, automated driving technologies that perform at least one of acceleration/deceleration, steering, and braking automatically have been under development. For example, Japanese Patent Laid-Open No. 2017-197066 discloses a configuration of a vehicle control system, in which a permitted automated driving mode is associated with a permitted travel area, and the permitted automated driving mode is switched to another mode according to a skill level of an occupant.

Japanese Patent Laid-Open No. 2017-197066 however disclose no configuration to control performing an automated driving function in a more advanced control state based on a skill level of a vehicle occupant.

The present invention is at least to solve the above-described problem and provides a travel control technique that enables control of performing an automated driving function in a more advanced control state based on a skill level of a vehicle occupant.

SUMMARY OF THE INVENTION

According to one aspect of the present invention, there is provided a travel control apparatus that controls automated driving travel of a vehicle by making a transition between a plurality of control states based on a surrounding environment of the vehicle, the travel control apparatus including: a skill level acquisition unit configured to acquire a skill level of a vehicle occupant about automated driving; and a control unit configured to control the automated driving travel of the vehicle in one of the plurality of control states based on the surrounding environment of the vehicle sensed by a sensing unit, wherein in a case where it is determined, based on a result of sensing by the sensing unit, that a transition can be made from a first control state, one of the plurality of control states, to a second control state, which has a higher automatization rate of the automated driving travel or has a lower level of requested task to the vehicle occupant than the first control state, the control unit controls performing an automated driving function in the second control state based on the skill level.

According to the present invention, it is possible to control performing an automated driving function in a more advanced control state based on a skill level of a vehicle occupant.

BRIEF DESCRIPTION OF THE DRAWINGS

FIG. 2 is a diagram illustrating a relation between skill level and cumulative score by example;

FIG. 3 is a diagram illustrating a relation between skill level and achievement ratio by example;

FIG. 4 is a diagram illustrating a relation between skill level and frequency of a requested task output to a vehicle occupant by example;

FIG. 6 is a diagram illustrating a configuration example of a skill level database;

DESCRIPTION OF THE EMBODIMENTS

An embodiment of the present invention will be described below with reference to the drawings. Constituent components described in the embodiment are merely an example and do not mean that they are limited by the following embodiment.

(Configuration of Travel Control Apparatus)

Figure 1A:
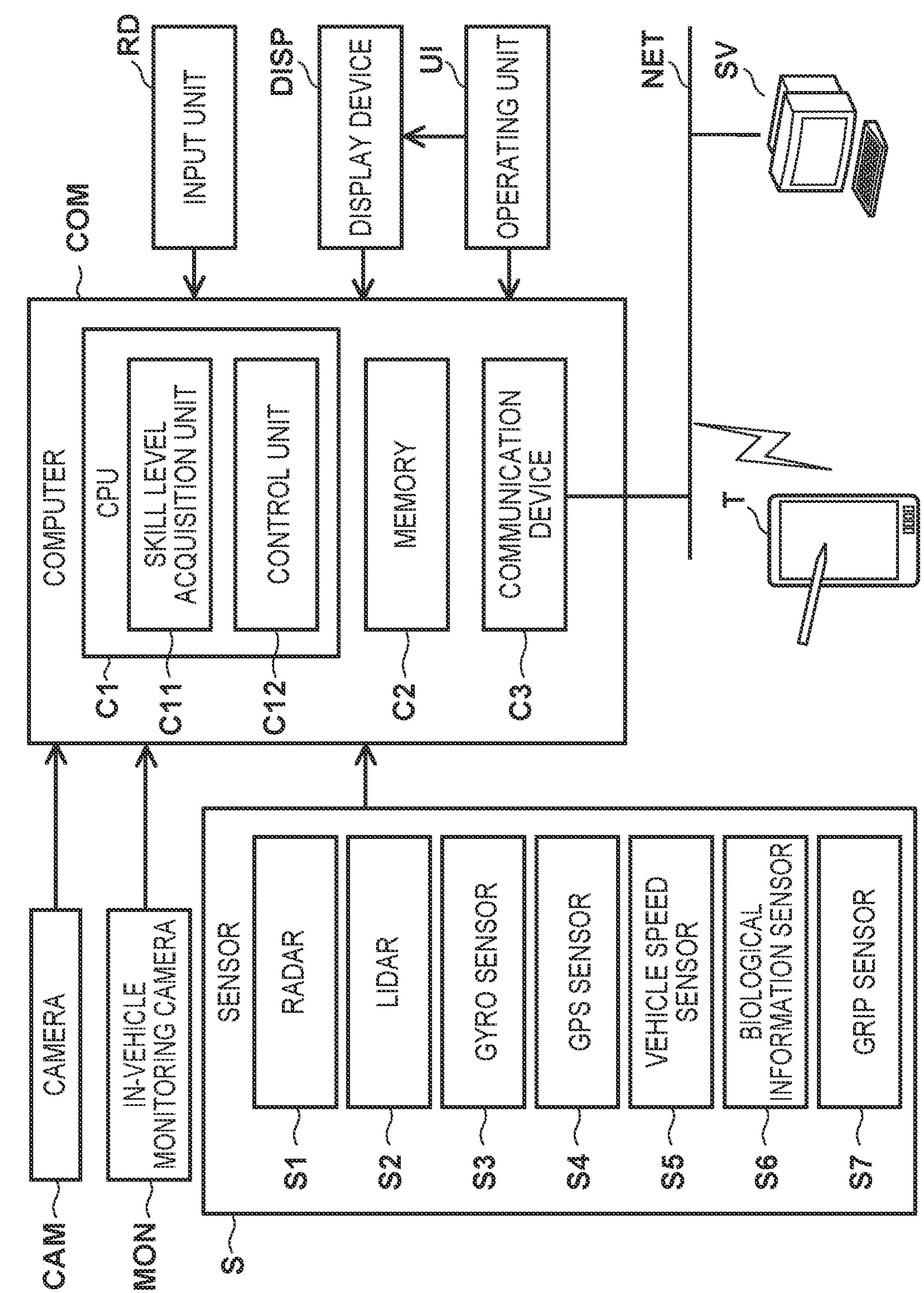
FIG. 1A is a block diagram illustrating a basic configuration of a travel control apparatus.

FIG. 1A is a diagram illustrating a basic configuration of a travel control system including a travel control apparatus 100 that performs automated driving control on a vehicle, where the travel control apparatus 100 includes a sensor S, a camera CAM, an in-vehicle monitoring camera MON, a computer COM, a display device DISP, an operation unit UI that functions as an operation input unit for operating the display device DISP, and an input unit RD for inputting information on a vehicle occupant (driver) (information on an electronic card such as an IC card, sound information, fingerprint information, etc.). The sensor S includes, for example, a radar S1, a light detection and ranging (LIDAR) S2, a gyro sensor S3, a GPS sensor S4, a vehicle speed sensor S5, a biological information sensor S6 (biological information sensing unit), and a grip sensor S7.

The computer COM includes a CPU (C1) that governs processing relating to automated driving control of the vehicle, a memory C2, and a communication device C3 that can be connected to a network NET to communicate with a server apparatus SV or an external terminal T on the network. The sensor S and the camera CAM acquire various kinds of information on the vehicle and input the information to the computer COM.

The CPU (C1) of the computer COM performs image processing on image information that is input from the camera CAM. Based on camera image information resulting from the image processing and sensor information that is input from the sensor S (radar S1 and LIDAR S2), the CPU (C1) extracts targets (objects) that are present around the self-vehicle and analyzes what targets are disposed around the self-vehicle.

The gyro sensor S3 senses rotating motion and attitude of the self-vehicle, and the computer COM can determine a course of the self-vehicle based on a result of the sensing by the gyro sensor S3, a vehicle speed sensed by the vehicle speed sensor S5, and the like. The GPS sensor S4 senses a current position (positional information) on the self-vehicle in map information.

The biological information sensor S6 is built, for example, in a steering wheel of the vehicle and can sense a blood pressure and a pulse of the vehicle occupant (driver) who takes the steering wheel. Results of the sensing (blood pressure, pulse) by the biological information sensor S6 are input to the computer COM, and the CPU (C1) of the computer COM analyzes the input biological information (blood pressure, pulse) and based on results of the analysis, performs an analysis as to whether the vehicle occupant is in a tense state while driving the automated driving vehicle (a degree of the tense state). Based on the tense state, a skill level acquisition unit C11 can acquire a skill level of the vehicle occupant.

The grip sensor S7 is built, for example, in the steering wheel of the vehicle and can sense whether the vehicle occupant (driver) is gripping the steering wheel. The grip sensor S7 inputs grip information on the sensed steering wheel to the computer COM. Based on the input grip information on the steering wheel, the computer COM can determine whether the vehicle occupant (driver) is gripping the steering wheel, that is, whether the vehicle is in a hands-on state or a hands-off state.

The in-vehicle monitoring camera MON is disposed in such a manner as to shoot an interior of the vehicle and captures the vehicle occupant. The in-vehicle monitoring camera MON inputs appearance information on the shot vehicle occupant to the computer COM. The computer COM performs image processing on an image of the vehicle occupant that is input from the in-vehicle monitoring camera MON, so as to sense appearance information on the vehicle occupant such as a facial expression, a face orientation, a line of sight, a degree of opening of eyes, and a driving posture of the vehicle occupant. Based on the sensed appearance information on the vehicle occupant, the computer COM can determine whether the vehicle occupant (driver) is in an eyes-on state or an eyes-off state, as a driving state of the vehicle occupant (driver).

The computer COM of the travel control apparatus 100 can make stepwise transitions between a plurality of control states based on information on a surrounding environment of the vehicle, so as to control automated driving travel of the vehicle. That is, the computer COM uses the information on the sensor S and the camera CAM to acquire the information on the surrounding environment of the vehicle and, based on the information on the surrounding environment, make transitions between the control states of the vehicle, so as to control the automated driving travel of the vehicle.

The CPU (C1) of the computer COM functions as the skill level acquisition unit C11 and a control unit C12 by executing a control program that is stored in the memory C2. The skill level acquisition unit C11 acquires a skill level of the vehicle occupant about the automated driving (hereafter, referred simply to as "skill level information"). The control unit C12 controls the automated driving travel of the vehicle in one of the plurality of control states based on the surrounding environment of the vehicle sensed by a sensing unit (sensor S and camera CAM).

Here, the plurality of control states each include a setting of automatization of the automated driving travel that includes at least automated control relating to acceleration, deceleration, steering, and braking of the vehicle, and each include a setting of a requested task to be issued to the vehicle occupant. The requested tasks to the vehicle occupant include actions requested from the vehicle occupant to deal with a request for monitoring surroundings of the vehicle, such as hands-off, hands-on, eyes-off, eyes-on, and changing a driver. The plurality of control states are classified into a plurality of steps according to an automatization rate in the automated driving travel and a level of a requested task to the vehicle occupant (a degree of involvement of the vehicle occupant in vehicle operation).

The control unit C12 controls the automated driving travel of the vehicle in one of the plurality of control states based on the information on the surrounding environment of the vehicle acquired from the sensor S and the camera CAM. For example, based on information of some surrounding environment, the control unit C12 selects a first control state, which is one of the plurality of control states, and controls the automated driving travel according to an automatization rate of the automated driving travel that is set in the first control state and to a requested task to the vehicle occupant (driver).

In a case where a change in the information on the surrounding environment is sensed during the automated driving travel in the first control state, for example, in a case where a change in a state of traveling on an expressway to a state of following a traffic jam on the expressway is sensed by the sensor S and the camera CAM, the control unit C12 is enabled to make a transition of a state from the first control state to a second control state, which is a more advanced control state than the first control state, according to the sensed information on the surrounding environment.

In the travel control apparatus in the present embodiment, in a case where it is determined, based on a result of sensing by the sensing unit (sensor S and camera CAM), that a transition can be made from the first control state, one of the plurality of control states, to the second control state, which has a higher automatization rate of the automated driving travel or has a lower requested task to the driver than the first control state, the control unit C12 controls performing the automated driving travel in the second control state based on the skill level of the vehicle occupant. In a case where the skill level of the vehicle occupant is higher than a threshold value, the control unit C12 performs travel control in the second control state, and in a case where the skill level of the vehicle occupant is equal to or lower than the threshold value, the control unit C12 limits the travel control in the second control state. This holds true for control states that are more advanced than the second control state (a third control state, . . . , an (n−1)th control state, and an n-th control state (n is an integer).

(Skill Level of Vehicle Occupant About Automated Driving)

In a case of controlling the automated driving travel in the more advanced control state, an automatization rate in travel control of the vehicle is increased, whereas a task requested of the vehicle occupant (driver) differs in different control states. A skill level corresponding to a control state is requested of the vehicle occupant so that the vehicle occupant understands a requested task to be able to perform proper operations. As a result, in a case where a skill level of a vehicle occupant about automated driving is equal to or lower than a threshold value, it is preferable to limit an automated driving function in a more advanced control state and perform travel control in such a manner that an automated driving function is released in the more advanced control state on a condition that the skill level of the vehicle occupant about the automated driving is higher than the threshold value (threshold skill level).

Here, the skill level of the vehicle occupant about the automated driving refers to an evaluation result of operations corresponding to a requested task from a travel control apparatus 100, a degree of understanding of a job of monitoring a surrounding environment during automated driving travel (degree of understanding of an automated driving function), or an evaluation index of an experience value of driving an automated driving vehicle. The higher the evaluation result of operations corresponding to a requested task, the degree of understanding of the automated driving function, or the experience value is, the higher the skill level is determined to be. The skill level can be an evaluation index resulting from determination of a degree of a tense state from biological information on the vehicle occupant (e.g., pulse, blood pressure, etc.). For example, different threshold values are set to different kinds of the biological information, and the CPU (C1) can analyze the degree of a tense state by comparison between the pulse and the blood pressure of the vehicle occupant and the threshold values. The skill level acquisition unit C11 evaluates the degree of the tense state quantitatively, so that it is possible to convert the degree into a score and add a value of the score to a cumulative score, from which the skill level can be obtained.

The skill level of the vehicle occupant refers, for example, to a driver-specific skill level that is associated with a driver who sits in a driver's seat. The following description will be given of a skill level of a driver as a skill level of a vehicle occupant, but this is not intended to limit examples of the skill level. The job of monitoring a surrounding environment may be performed by an occupant sitting in a front passenger seat and supporting a driver; therefore, a skill level of the occupant sitting in the front passenger seat may be combined with the skill level of the driver sitting in a driver's seat to determine a skill level of vehicle occupants.

In this case, different weight coefficients ($w1>w2$) may be set to different sitting locations. Assuming that a weight for a driver's seat is denoted by w1, a weight for a front passenger seat is denoted by w2, a skill level of a driver is denoted by J1, and a skill level of an occupant sitting in a front passenger seat is denoted J2, a result of adding products of the skill levels and the weight coefficients ($J1\times w1+J2\times w2$) may be acquired as the skill level of the vehicle occupants. Furthermore, in consideration of an occupant who sits in a rear passenger seat of a vehicle, denoted by J3, and a weight for the occupant, denoted by w3 ($w1>w2>w3$), a result of addition ($J1\times w1+J2\times w2+J3\times w3$) may be calculated as the skill level of the vehicle occupants.

As seen from the above, by using not only the skill level of the driver who sits in the driver's seat but also the skill levels of occupants who sit in the front and rear passenger seats, it is possible to control function release of an automated driving function in the more advanced control state based on a comprehensive skill level of vehicle occupants, even in a case where sitting locations inside an automated driving vehicle are configured to be changeable (e.g., the configuration allowing changes: driver's seat→rear passenger seat, rear passenger seat→front passenger seat, front passenger seat→driver's seat).

(Skill Level Based on Evaluation Result of Operations Corresponding to Requested Task)

The skill level acquisition unit C11 can acquire a skill level of a vehicle occupant about automated driving based on an evaluation result of operations corresponding to a requested task.

The skill level acquisition unit C11 can determine whether a vehicle occupant (driver) has taken proper actions (vehicle operations) for requested tasks (requests for actions) from the travel control apparatus 100 and can convert an evaluation result of the vehicle operations in an automated driving vehicle into a score, so as to obtain the skill level in a form of a cumulative value of scores. For example, in a case where a driver change request is output as a requested task from the travel control apparatus 100 and when a vehicle occupant takes a turn driving according to the requested task, the skill level acquisition unit C11 determines that a proper action (vehicle operation) has been taken.

Alternatively, in a case where a hands-on request (steering wheel grip request) is output as a requested task during travel in a hands-off state and when a vehicle occupant takes a hands-on action (steering wheel grip operation) according to the requested task, the skill level acquisition unit C11 determines that a proper action (vehicle operation) has been taken. Alternatively, in a case where an eyes-on request is output as a requested task during travel in an eyes-off state and when a vehicle occupant takes an eyes-on action according to the requested task, the skill level acquisition unit C11 determines that a proper action (vehicle operation) has been taken.

In a case where a proper action (vehicle operation) has been taken for a requested task by the vehicle occupant, an evaluation result of the proper action is converted into a positive score (positive conversion), by which a skill level can be obtained in a form of a cumulative value of scores.

In contrast, in a case where a proper action has not been taken for the requested task, an evaluation result of not having taken a proper action is converted into a negative score (negative conversion), by which a skill level can be obtained based on a result of subtraction from the cumulative value of scores.

FIG. 2 is a diagram illustrating a relation between skill level and cumulative score by example. Here, as an example, the skill level is divided into four ranks A, B, C, and D. In FIG. 2, a cumulative score P satisfies a relation of $0<n1<n2<n3$. The rank D is a rank that indicates a lowest skill level; when a score is equal to or greater than zero and less than n1, a skill level of a vehicle occupant (driver) is set at the rank D. A vehicle occupant who drives an automated driving vehicle first has a score of zero, and in this case, a skill level of the vehicle occupant is set at the rank D.

The rank C is a rank that indicates a skill level higher than the rank D; when a score is equal to or greater than n1 and less than n2, a skill level of a vehicle occupant is set at the rank C. Similarly, the rank B is a rank that indicates a skill level higher than the rank C; when a score is equal to or greater than n2 and less than n3, a skill level of a vehicle occupant is set at the rank B. The rank A is therefore a rank that indicates a highest skill level; when a score is equal to or greater than n3, a skill level of a vehicle occupant is set at the rank A.

In a case where a proper action is taken for a requested task, an evaluation result is determined to be a positive score, and a cumulative value can be increased. In a case where a proper action is not taken for the requested task, the evaluation result is determined to be a negative score, and the cumulative value can be decreased. The skill level is therefore an index that changes dynamically in a time-based driving history.

The evaluation result of an operation for a requested task can be obtained as an achievement ratio of the requested task rather than converting the evaluation result into a score. The skill level acquisition unit C11 can determine whether a vehicle occupant has taken appropriate actions with respect to a requested task that the travel control apparatus 100 has output a plurality of times (the number of outputs of the requested task) and can determine a skill level from an achievement ratio of the requested task that is obtained based on a result of the determination. In this case, the skill level acquisition unit C11 divides an appropriate action count A, which is the number of appropriate actions taken by the vehicle occupant, by an output count B of the requested task, obtaining a result (A/B) as an achievement ratio of the requested task, and from the achievement ratio, a skill level can be obtained.

FIG. 3 is a diagram illustrating a relation between skill level and achievement ratio by example. Here, as an example, the skill level is divided into four ranks A, B, C, and D, as in FIG. 2. The rank D is a rank that indicates a lowest skill level; when an achievement ratio is equal to or higher than zero and lower than r1, a skill level of a vehicle occupant (driver) is set at the rank D. In FIG. 3, an achievement ratio R of a requested task satisfies a relation of 0<r1<r2<r3.

The rank C is a rank that indicates a skill level higher than the rank D; when an achievement ratio is equal to or higher than r1 and lower than r2, a skill level of a vehicle occupant is set at the rank C. Similarly, the rank B is a rank that indicates a skill level higher than the rank C; when an achievement ratio is equal to or higher than r2 and lower than r3, a skill level of a vehicle occupant is set at the rank B. The rank A is therefore a rank that indicates a highest skill level; when an achievement ratio is equal to or higher than r3, a skill level of a vehicle occupant is set at the rank A.

In a case where a proper action is taken for a requested task, an achievement ratio of the requested task can be increased. In a case where a proper action is not taken for the requested task, the achievement ratio of the requested task can be decreased. The skill level based on the achievement ratio of the requested task is therefore an index that changes dynamically in a time-based driving history.

As a skill level based on an evaluation result of operations corresponding to a requested task, the skill level acquisition unit C11 can obtain a skill level based on a frequency of a requested task that is output to a vehicle occupant (driver) within a preset time period.

FIG. 4 is a diagram illustrating a relation between skill level and frequency of a requested task output to a vehicle occupant (driver) by example. Here, as an example, the skill level is divided into four ranks A, B, C, and D, as in FIG. 2. In FIG. 4, a frequency F of a requested task satisfies a relation of 0<f1<f2<f3.

The rank D is a rank that indicates a lowest skill level; when a frequency is equal to or higher than f3, a skill level of a vehicle occupant is set at the rank D. For example, when the in-vehicle monitoring camera senses that a vehicle occupant is looking aside while driving although the control state involves an eyes-on state, the travel control apparatus 100 outputs an eyes-on request to the vehicle occupant as a requested task. In a case where an eyes-on request is output f3 times or more within the preset time period, the skill level of the vehicle occupant is set at the rank D.

The rank C is a rank that indicates a skill level higher than the rank D; when a frequency of a requested task output to a vehicle occupant is equal to or higher than f2 and lower than f3, a skill level of the vehicle occupant is set at the rank C. Similarly, the rank B is a rank that indicates a skill level higher than the rank C; when a frequency of a requested task output to a vehicle occupant is equal to or higher than f1 and lower than f2, a skill level of the vehicle occupant is set at the rank B.

The rank A is therefore a rank that indicates a highest skill level; when a frequency of a requested task output to a vehicle occupant within the preset time period is equal to or higher than zero and lower than f1, a skill level of the vehicle occupant is set at the rank A. In a case where a count (frequency) of outputting an eyes-on request is lower than f1 within the preset time period, a vehicle occupant takes proper actions (vehicle operation) for a requested task (request for an action) from the travel control apparatus 100; therefore, an output frequency of the requested task is decreased, and a skill level of the vehicle occupant is set at the rank A, the highest rank, as an evaluation result of operations by the vehicle occupant for the requested task.

In a case where a proper action is taken for a requested task, a frequency of a requested task output within the preset time period is decreased. In a case where a proper action is not taken for the requested task, the frequency of the requested task is increased. The skill level is therefore an index that changes dynamically based on an output frequency of the requested task in a time-based driving history. The tables illustrated in FIG. 2 to FIG. 4 are preset in the memory C2 of the travel control apparatus 100, and the skill level acquisition unit C11 can acquire a skill level by referring to the tables in the memory C2.

(Skill Level Based on Learning Automated Driving Functions)

Regarding to a vehicle having an automated driving function, there is a case where a vehicle occupant (driver) is beforehand given an explanation to correctly understand various operating conditions and the like relating to the automated driving function of the vehicle and required to obtain confirmation, certification, or the like about how well the vehicle occupant understand contents of the explanation.

Such experience of a vehicle occupant in learning of the automated driving function can be converted into a score and translated into ranking a skill level of the vehicle occupant. For example, using the external terminal T or the display device DISP that functions as an on-board monitor, identification information on a vehicle occupant is input, the learning is started, when confirmation of contents of explanation is completed, a score is issued by a system, and the skill level acquisition unit C11 may add the issued score to a cumulative score, from which the skill level may be obtained. A result of learning of the automated driving function is converted into a score as an evaluation index used to improve understanding of the automated driving function and understanding of actions requested of a driver, and the score is added to a cumulative value of scores that are converted into as other kinds of evaluation indexes, so that it is possible to obtain the skill level. For example, it is also possible that a score based on a result of the learning of the automated driving function is added to a cumulative value of scores based on evaluation results of operations corresponding to requested tasks to obtain a total score, and based on the total score, the skill level acquisition unit C11 refers to the table of FIG. 2 to acquire the skill level of the vehicle occupant.

The skill level based on the result of the learning of the automated driving function serves as a static evaluation index that is invariable in the time-based driving history.

(Skill Level Based on Experience Value of Driving Automated Driving Vehicle)

The skill level acquisition unit C11 can convert a traveling distance or a traveling time into a score as an experience value of driving an automated driving vehicle by a vehicle occupant (driver) and obtain a skill level based on a cumulative value of scores.

By converting an experience value (traveling distance or traveling time) into a score as an evaluation index and adding the score to a cumulative value of scores that are converted into as other kinds of evaluation indexes, it is possible to obtain the skill level. For example, it is also possible that a score based on an experience value is added to a cumulative value of scores based on evaluation results of operations corresponding to requested tasks or to a score based on the result of the learning, so as to obtain a total score, and based on the total score, the skill level acquisition unit C11 refers to the table of FIG. 2 to acquire the skill level of the vehicle occupant.

(Management of Skill Level)

Skill levels are pieces of information specific to vehicle occupants (drivers) and stored to be collectively managed in a database in the server apparatus SV included in the travel control system or a server apparatus SV installed in a dealer that serves as a sales base for automated driving vehicles.

Figure 5:
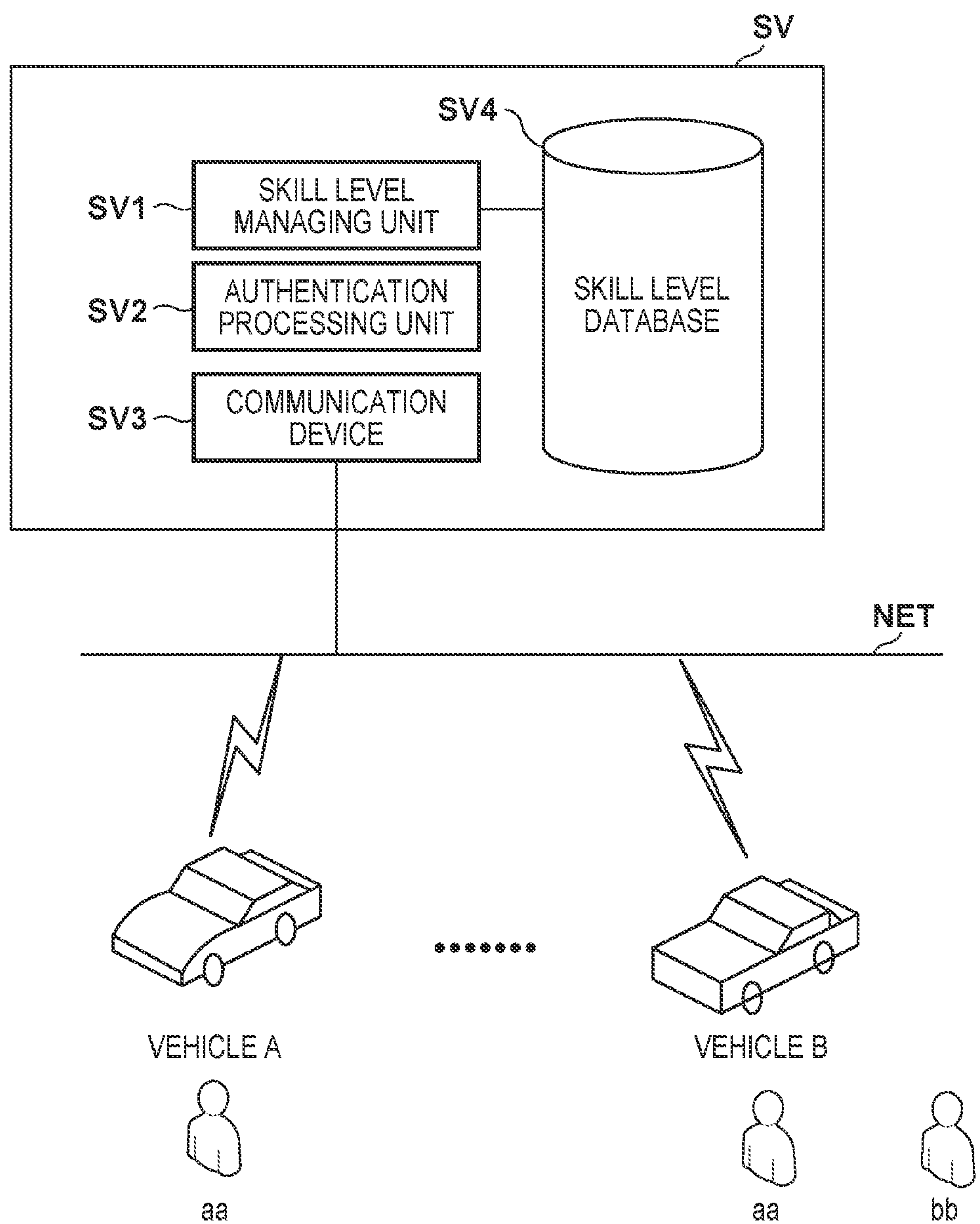
FIG. 5 is a diagram illustrating a configuration of a server apparatus SV included in a travel control system, by example.

FIG. 5 is a diagram illustrating a configuration of the server apparatus SV included in the travel control system, by example. The server apparatus SV includes a skill level managing unit SV1, an authentication processing unit SV2, a communication device SV3, and a skill level database SV4. A functional configuration of the skill level managing unit SV1 and the authentication processing unit SV2 are implemented by a CPU of the server apparatus SV executing a program. The communication device SV3 is formed of a communications interface circuit that performs communication processing, and the skill level database SV4 is formed of a storage device such as a hard disk drive.

In the server apparatus SV, the skill level managing unit SV1 stores the pieces of identification information on vehicle occupants (user IDs) transmitted from vehicles A, B, and the like in the skill level database SV4 after associating the pieces of identification information with pieces of authentication information for personal authentication and with skill levels. FIG. 6 is a diagram illustrating a configuration example of the skill level database SV4; in the skill level database SV4, user IDs of vehicle occupants, pieces of server-side authentication information, and skill levels are associated together. The pieces of server-side authentication information (Aut1 to Aut4) each contain, for example, authentication information on a vehicle occupant that is read from an electronic card, authentication information that is formed based on features extracted from data on a face image of the vehicle occupant, or authentication information that is formed based on features extracted from sound data on the vehicle occupant.

For example, each of vehicle occupants (drivers) uses the external terminal T or the display device DISP that functions as an on-board monitor, to input identification information on the vehicle occupant and starts the learning, when confirmation of contents of the explanation is completed, the skill level managing unit SV1 issues a score and adds the score to a skill level of the vehicle occupant stored in the skill level database SV4.

Based on pieces of authentication information for personal authentication on vehicle occupants transmitted from the vehicles A, B, and the like, the authentication processing unit SV2 performs authentication processing as to whether the vehicle occupants indicated by the authentication information are users who are registered in the skill level database SV4. The authentication processing unit SV2 performs the authentication processing by comparing information in skill level database SV4 with the information transmitted from the vehicles A, B, and the like.

The communication device SV3 can communicate with travel control apparatuses 100 of the vehicles A, B, and the like over the network NET. In a case where the communication device SV3 receives registration requests for skill levels from the travel control apparatuses 100 of the vehicles A, B, and the like over the network NET, the skill level managing unit SV1 stores the pieces of identification information on the vehicle occupants (user IDs) transmitted from the vehicles A, B, and the like in the skill level database SV4 after associating the pieces of identification information with the pieces of authentication information for authenticating the vehicle occupants and with the skill levels. This enables newly registering a skill level and updating a skill level already stored with a skill level based on an up-to-date driving history.

In a case where the communication device SV3 receives an acquisition request for skill levels from the travel control apparatuses 100 of the vehicles A, B over the network NET, the authentication processing unit SV2 performs the authentication processing, and when pieces of authentication information registered in the skill level database SV4 matches the pieces of authentication information transmitted from the travel control apparatuses 100 for authenticating the vehicle occupants, the skill level managing unit SV1 acquires skill levels corresponding to the pieces of identification information (user IDs) on the authenticated vehicle occupants from the skill level database SV4 and transmits the pieces of identification information to the travel control apparatuses 100 of the vehicles that have made the requests.

When transmitting an acquisition request for a skill level to the server apparatus SV, the computer COM of the travel control apparatus 100 performs image processing on a face image of a vehicle occupant shot by the in-vehicle monitoring camera MON to extract features of the face image and generates authentication information that is formed based on the extracted features. The communication device C3 of the computer COM then transmits the generated authentication information to the server apparatus SV over the network NET.

The authentication processing unit SV2 of the server apparatus SV performs the authentication processing based on the transmitted authentication information, the skill level managing unit SV1 acquires a skill level specific to an authenticated vehicle occupant from the skill level database SV4, and the communication device SV3 transmits the skill level to the travel control apparatus 100 that has transmitted the authentication information. The communication device C3 of the computer COM receives the skill level of the vehicle occupant authenticated by the server apparatus SV over the network NET and stores the skill level in the memory C2. The skill level acquisition unit C11 acquires the skill level received by the communication device C3 from the memory C2.

At a time of a start of driving by the vehicle occupant, the skill level acquisition unit C11 sets the skill level acquired from the server apparatus SV as an initial value of the skill level of the vehicle occupant, and at the time of the start of driving, the control unit C12 controls, based on the initial value of the skill level, performing an automated driving function in the second control state, which is the more advanced control state.

The skill level acquisition unit C11 combines the initial value of the skill level of the vehicle occupant and the skill level of the vehicle occupant acquired after the start of driving to acquire an after-driving-start skill level, and after the start of driving, the control unit C12 controls, based on the after-driving-start skill level, performing the automated driving function in the second control state, the more advanced control state.

By acquiring the skill level stored in the skill level database SV4 of the server apparatus SV, the skill level acquisition unit C11 can inherit the skill level that is based on a history of past drives performed by the authenticated vehicle occupant (driver), and regarding this skill level as an initial value, the control unit C12 can determine release of an automated driving function.

A skill level is specific information that is associated with each user, and a skill level that is based on a history of past performed drives can be inherited. In a case where a skill level of a user having a user ID "aa" has already exceeded a threshold value, the control unit C12 performs travel control such that an automated driving function in the more advanced control state is released. In contrast, in a case where the skill level of the user having the user ID "aa" is equal to or lower than the threshold value, the control unit C12 limits the automated driving function in the more advanced control state. For example, even in a case where the user having the user ID "aa" uses a car sharing system to drive the vehicle A or the vehicle B, the skill level based on a history of past drives performed by the user having the user ID "aa" can be inherited.

When a user having a user ID "bb" with no experience of driving an automated driving vehicle even in a case where the user having the user ID "aa" drives the vehicle B and the automated driving function in the more advanced control state is released based on the skill level of the user having the user ID "aa", the automated driving function in the more advanced control state is limited because a skill level of the user having the user ID "bb" is zero.

Authentication information used for authenticating a vehicle occupant is not limited to information that is formed based on features extracted from a face image of the vehicle occupant and can be generated based on information input from the input unit RD. For example, in a case where the input unit RD functions as an electronic card reading unit (IC card reader), the input unit RD may read authentication information on a vehicle occupant that is stored in a memory of an electronic card, and based on the authentication information on the vehicle occupant read by the input unit RD, the authentication processing unit SV2 of the server apparatus SV may perform the authentication processing.

In another case, where the input unit RD functions as a microphone for sound input, the computer COM may perform sound analysis processing to extract features of a sound, and based on authentication information that is formed based on the extracted features of the sound, the authentication processing unit SV2 of the server apparatus SV may perform the authentication processing.

In a case where the travel control apparatus 100 illustrated in FIG. 1A is installed in a vehicle, the computer COM may be disposed in a recognition-processing-purpose ECU or an image-processing-purpose ECU that processes information from the sensor S, the camera CAM, and the in-vehicle monitoring camera MON, may be disposed in an ECU that controls a communication device or an input/output device, or may be disposed in an ECU within a controlling unit that performs drive control of the vehicle or an ECU for automated driving. For example, as illustrated FIG. 1B described below, functions may be distributed to a plurality of ECUs that form the travel control apparatus 100, including an ECU for the sensor S, an ECU for the camera, an ECU for the input/output device, and an ECU for the automated driving.

Figure 1B:
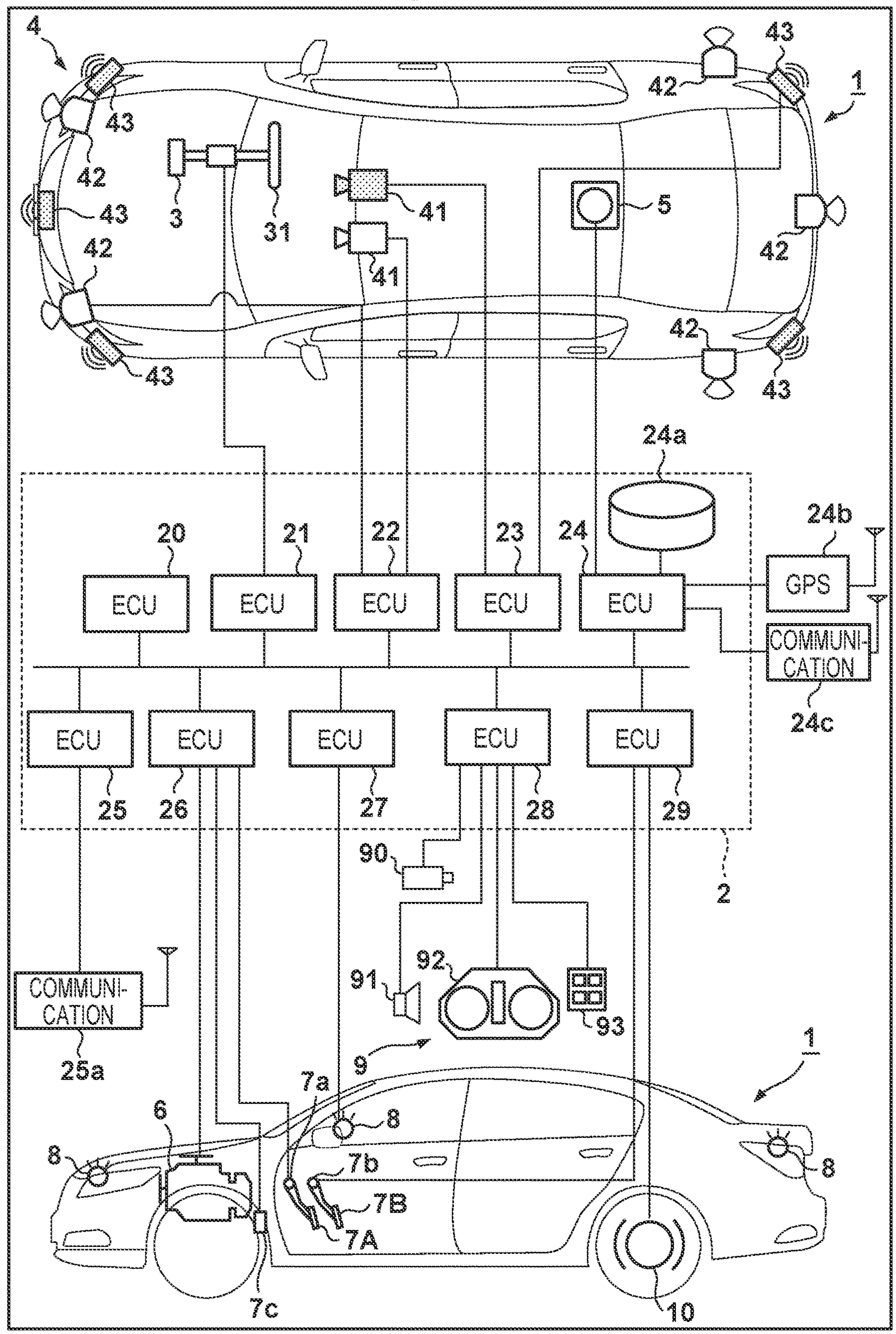
FIG. 1B is a diagram illustrating a configuration example of a control block diagram relating to controlling a vehicle.

FIG. 1B is a diagram illustrating a configuration example of a control block diagram of the travel control apparatus 100 for controlling a vehicle 1. In FIG. 1B, the vehicle 1 is schematically illustrated in a plan view and a side view. As an example, the vehicle 1 is a four-wheeled sedan passenger car.

In FIG. 1B, a controlling unit 2 controls parts of the vehicle 1. The controlling unit 2 includes a plurality of ECUs 20 to 29 that are connected to communicate with one another via an in-vehicle network. Each ECU (Electronic Control Unit) includes a processor, typically a CPU (Central Processing Unit), a storage device such as a semiconductor memory, and an interface to an external device. The storage device stores a program to be executed by the processor and data to be used by the processor and the like. Each ECU may include a plurality of processors, storage devices, and interfaces.

Hereafter, functions and the like fulfilled by the ECUs 20 to 29 will be described. A number of ECUs and functions fulfilled by the ECUs can be designed as appropriate in a design of the vehicle 1, and can be further fragmented or more integrated than the present embodiment.

The ECU 20 performs vehicle control relating to automated driving of the vehicle 1 (self-vehicle) according to the present embodiment. In the automated driving, automated control is performed on at least one of steering and acceleration/deceleration of the vehicle 1. Processing for specific control relating to the automated driving will be described later in detail.

In the travel control of the vehicle, the ECU 20 controls automated driving travel of the vehicle after setting an automated driving level based on a position of the vehicle 1 (self-vehicle), relative positions of other vehicles around the vehicle 1, information on a road on which the vehicle 1 travels, map information, and the like that indicate surrounding circumstances of the vehicle.

The ECU 21 controls an electric power steering device 3. The electric power steering device 3 includes a mechanism that steers front wheels in accordance with driving operations (steering operations) to a steering wheel 31 by a driver. The electric power steering device 3 also includes a motor that exerts driving force for assisting the steering operations or steering the front wheels automatically, a sensor that senses a steering angle. In a case where a driving state of the vehicle 1 is automated driving, the ECU 21 performs the automated control on the electric power steering device 3 in accordance with instructions from the ECU 20, so as to control a travel direction of the vehicle 1 traveling.

The ECUs 22 and 23 control sensing units 41 to 43 that sense the surrounding circumstances of the vehicle and performs information processing on sensing results from the sensing units 41 to 43. The sensing units 41 are each a shooting device that senses objects around the vehicle 1 by shooting (hereafter, written as a camera 41 in some cases). The cameras 41 are attached to a vehicle-interior side of a windshield near a front portion of a roof of the vehicle 1 so as to shoot ahead of the vehicle 1. By analyzing (image processing) images taken by the cameras 41, contours of targets or lane separation lines (white lines, etc.) on roads can be extracted.

The sensing units 42 (LIDAR sensing units) are each, for example, light detection and ranging (LIDAR) (hereafter, written as a LIDAR 42 in some cases) and use light to sense targets around the vehicle 1 and to measure distances between the vehicle 1 and the targets. In a case of the present embodiment, a plurality of LIDARs 42 are provided on a perimeter of the vehicle. For example, in the example illustrated in FIG. 1B, five LIDARs 42 are provided, one on each of front corners, one on a rear center, and one on each of rear lateral sides, of the vehicle 1. The sensing units 43 (radar sensing units) are each, for example, a millimeter-wave radar (hereafter, written as a radar 43 in some cases) and use radio waves to sense targets around the vehicle 1 and to measure distances between the vehicle 1 and the targets. In a case of the present embodiment, a plurality of radars 43 are provided on a perimeter of the vehicle. For example, in the example illustrated in FIG. 1B, five radars 43 are provided, one on a front center, one on each of the front corners, and one on each of the rear lateral sides, of the vehicle 1.

The ECU 22 controls one of the cameras 41 and the LIDARs 42, and performs information processing on sensing results from the one of the cameras 41 and the LIDARs 42. The ECU 23 controls the other of the cameras 41 and the radars 43, and performs information processing on sensing results from the other of the cameras 41 and the radars 43. By providing two sets of devices for sensing the surrounding circumstances of the vehicle, it is possible to enhance reliability of the sensing results, and by providing different kinds of sensing units including the cameras, LIDARs, and radars, it is possible to analyze the surrounding environments of the vehicle from various perspectives. The ECU 22 and the ECU 23 may be integrated into one ECU.

The ECU 24 controls the gyro sensor 5, the GPS sensor 24*b* and the communication device 24*c*, and performs information processing on sensing results from the gyro sensor 5, the GPS sensor 24*b* and the communication device 24*c*. The gyro sensor 5 senses rotating motions of the vehicle 1. From a sensing result from the gyro sensor 5 and a wheel speed, a course of the vehicle 1 can be determined. The GPS sensor 24*b* senses a current position of the vehicle 1. The communication device 24*c* communicates wirelessly with a server apparatus that provides map information and traffic information, so as to acquire these kinds of information. The ECU 24 can access a database 24*a* of map information that is built in its storage device, to search for a route from a current location to a destination. The database 24*a* can be disposed on a network, enabling the communication device 24*c* to access the database 24*a* on the network to acquire information.

The ECU 25 includes a communication device 25*a* for vehicle-to-vehicle communication. The communication device 25*a* communicates other vehicles around the vehicle wirelessly to exchange information between the vehicles.

The ECU 26 controls a power plant 6. The power plant 6 is a mechanism for outputting drive force that rotates driving wheels of the vehicle 1 and includes, for example, an engine and a transmission. For example, the ECU 26 controls output of the engine in accordance with a driving operation by a vehicle occupant (driver) sensed by an operation sensing sensor 7*a* that is provided in an accelerator pedal 7A (accelerator pedal operation or accelerating operation), and changes a gear ratio of the transmission based on information on a vehicle speed sensed by a vehicle speed sensor 7*c*. In a case where the driving state of the vehicle 1 is the automated driving, the ECU 26 performs automated control on the power plant 6 to control acceleration and deceleration of the vehicle 1 in accordance with instructions from the ECU 20.

The ECU 27 controls lamps (headlights, taillights, etc.) including direction indicators 8. In the example illustrated in FIG. 1B, the direction indicators 8 are provided in a front portion, door mirrors, and a rear portion of the vehicle 1.

The ECU 28 controls an input/output device 9 and performs image processing on a face image of a driver that is input from an in-vehicle monitoring camera 90. Here, the in-vehicle monitoring camera 90 is equivalent to the in-vehicle monitoring camera MON illustrated in FIG. 1A. The input/output device 9 outputs information on a vehicle occupant (driver) and receives input of information from the driver. A sound output device 91 notifies a driver of information by sound. A display device 92 notifies a driver of information by displaying an image. The display device 92 is disposed, for example, in front of a driver's seat, forming an instrument panel or the like. A configuration using sound and display for the notification of information is described here by example, but the notification may be given in a form of vibration or light. The notification may be alternatively given by a combination of two or more of sound, display, vibration, and light. In addition, the combination may be changed, or a form of the notification may be changed in accordance with a level of information to be notified (e.g., urgency).

An input device 93 includes switches that are disposed at positions allowing a driver to operate the switches and are used for giving instructions to the vehicle 1, and may also include a sound input device. The display device 92 is equivalent to, for example, the display device DISP illustrated in FIG. 1A described earlier, and the input device 93 is equivalent to the operation unit UI illustrated in FIG. 1A.

The ECU 29 controls brake devices 10 and a parking brake (not illustrated). The brake devices 10 are, for example, disk brake devices provided in respective wheels of the vehicle 1 and apply resistance to rotation of the wheels to decelerate or stop the vehicle 1. The ECU 29, for example, controls work of the brake devices 10 in accordance with driving operation of a driver that is sensed by the operation sensing sensor 7*b* provided in the brake pedal 7B (braking operation). In a case where the driving state of the vehicle 1 is automated driving, the ECU 29 performs automated control on the brake devices 10 in accordance with instructions from the ECU 20, so as to control the deceleration and the stop of the vehicle 1. The brake devices 10 and the parking brake can work to maintain a stop state of the vehicle 1. In a case where the transmission of the power plant 6 includes a parking lock mechanism, the parking lock mechanism can work to maintain the stop state of the vehicle 1.

Figure 7:
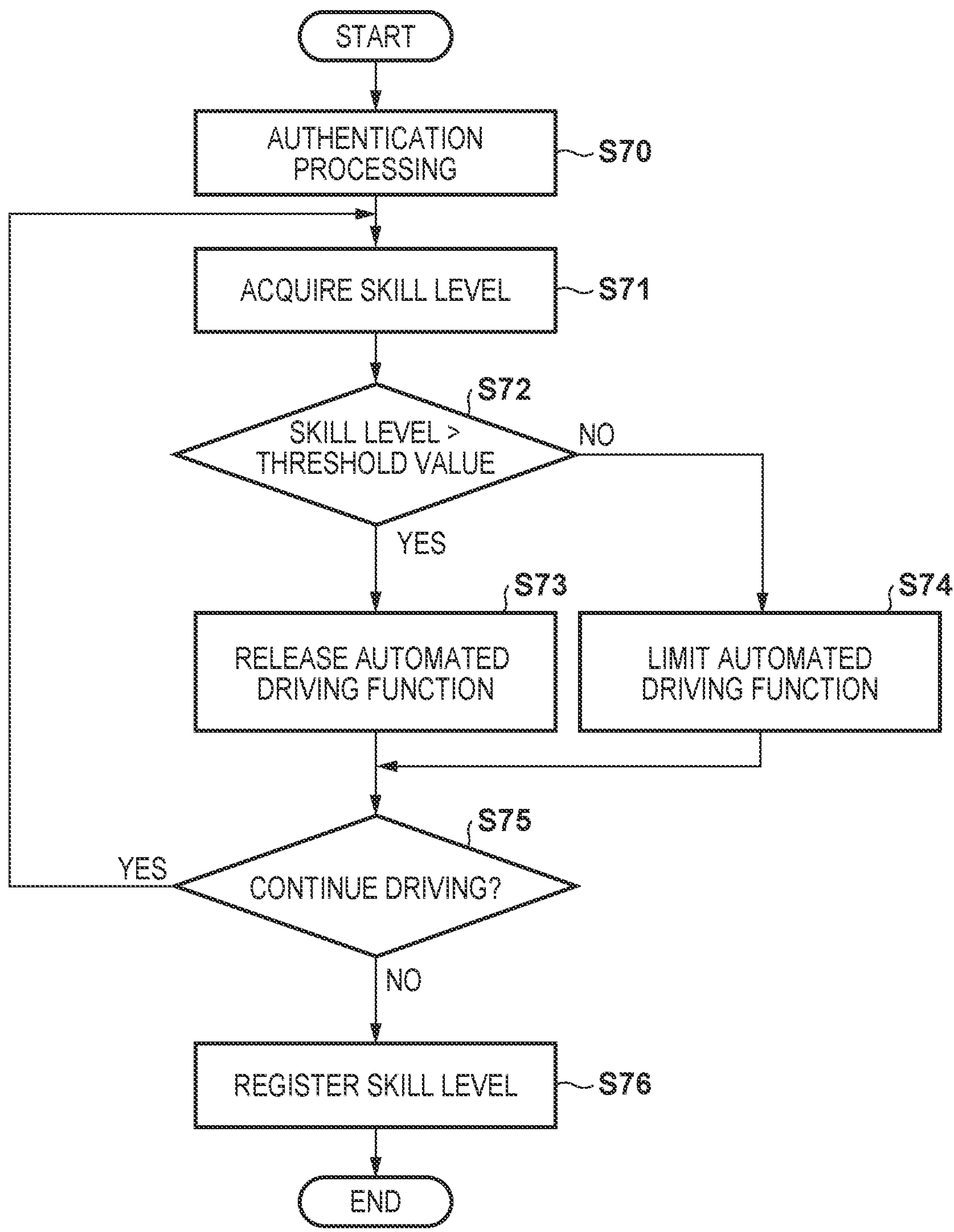
FIG. 7 is a chart used for describing a flow of processing of stepwise function release in an automated driving function.

FIG. 7 is a diagram used for describing a flow of processing for stepwise function release of an automated driving function by the travel control apparatus 100. First, in step S70, the authentication processing is performed on an occupant of the vehicle 1. The computer COM of the travel control apparatus 100 performs image processing on a face image of the vehicle occupant shot by the in-vehicle monitoring camera MON to extract features of the face image and generates authentication information that is formed based on the extracted features. The generation of the authentication information is not limited to that based on a face image of a vehicle occupant; authentication information read from an electronic card can be used, as described earlier.

The authentication processing unit SV2 of the server apparatus SV performs the authentication processing based on the authentication information transmitted from the travel control apparatus 100.

In step S71, the skill level acquisition unit C11 of the travel control apparatus 100 acquires a skill level of the vehicle occupant. In a case where the authentication processing by the server apparatus SV shows that data on the authenticated vehicle occupant has already been stored in the skill level database SV4, the skill level acquisition unit C11 acquires a skill level transmitted from the communication unit SV3 of the server apparatus SV and, regarding this skill level as an initial value, acquires a skill level of the vehicle occupant during driving. The skill level acquisition unit C11 acquires a skill level of the vehicle occupant during driving based on, as described earlier, an evaluation result of operations corresponding to a requested task, an experience value of driving an automated driving vehicle, and a degree of a tense state that is determined based on biological information such as pulse and blood pressure. In a case where the vehicle occupant learns in advance an automated driving function before the driving, a score based on a result of the learning is translated into a skill level.

Figure 8:
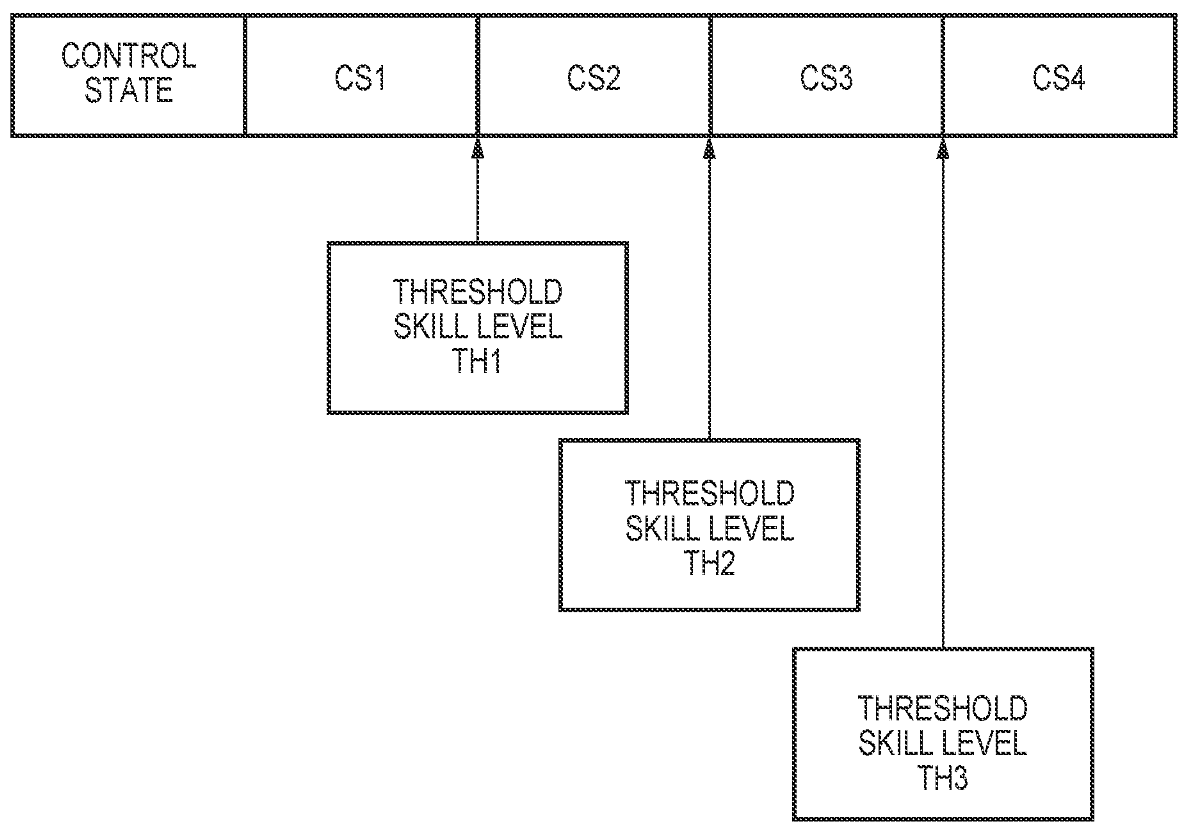
FIG. 8 is a diagram illustrating a relation between control state and threshold value (threshold skill level) by example.

In step S72, the control unit C12 of the travel control apparatus 100 determines whether the skill level exceeds a threshold value (threshold skill level). FIG. 8 is a diagram illustrating a relation between control state and threshold value (threshold skill level) by example. In FIG. 8, CS1 to CS4 denotes control states, and CS2 represents a control state more advanced than CS1. CS3 represents a control state more advanced than CS2, and similarly, CS4 represents a control state more advanced than CS3. The control state can make a transition between the control states CS1 and CS2 based on a surrounding environment of the vehicle sensed by the camera CAM and the sensor S. Similarly, the control state can make a transition between the control states CS2 and CS3, and between the control states CS3 and CS4.

Between the control state CS1 and the control state CS2, a threshold skill level TH1 is set, between the control state CS3 and the control state CS2, a threshold skill level TH2 is set, and between the control state CS4 and the control state CS3, a threshold skill level TH3 is set.

The travel control apparatus 100 in the present embodiment limits a release of an automated driving function in a more advanced control state based on the skill level of the vehicle occupant even in a surrounding environment that allows a transition to the more advanced control state based on sensing results from the camera CAM and the sensor S.

In a case where a transition can be made to a more advanced control state than any one of a plurality of control states based on sensing results from the camera CAM and the sensor S, the control unit C12 controls performing automated driving travel in the more advanced control state based on the skill level. When the skill level of the vehicle occupant is higher than the threshold skill level TH1 (S72—Yes), the processing is moved to step S73.

In step S73, the control unit C12 releases an automated driving function in the more advanced control state. For example, the control unit C12 releases an automated driving function in the control state CS2 illustrated in FIG. 8. Similarly, when the skill level of the vehicle occupant is higher than the threshold skill level TH2, the control unit C12 releases an automated driving function in the control state CS3 illustrated in FIG. 8, and when the skill level of the vehicle occupant is higher than the threshold skill level TH3, the control unit C12 releases an automated driving function in the control state CS4 illustrated in FIG. 8.

In contrast, when the determination in step S72 shows that the skill level of the vehicle occupant is equal to or lower than the threshold skill level TH1 (S72—No), the processing is moved to step S74.

In step S74, the control unit C12 limits the automated driving function in the more advanced control state. In this case, even when making a transition of the control state can be allowed based on sensing results from the camera CAM and the sensor S, the control unit C12 limits the automated driving function in the more advanced control state based on a determination result of the skill level.

In step S75, whether to continue driving by the vehicle occupant is determined, and when it is determined that the driving is to be continued (S75 —Yes), the processing is returned to step S71, and the process for acquiring a skill level and the subsequent processes are repeated. In a case where the skill level of the vehicle occupant increases to be higher than the threshold value (threshold skill level), such as a case where an evaluation result of operations corresponding to a requested task or an experience value of driving an automated driving vehicle increases, the tense state determined based on biological information such as pulse and blood pressure changes to a tranquil state, the control unit C12 releases the automated driving function in the more advanced control state. The limited automated driving function is released (unlocked).

When the determination in step S75 shows that the driving by the vehicle occupant is not to be continued, (S75—No), that is, when the driving is to be ended, the processing is moved to step S76. In step S76, the communication device C3 of the travel control apparatus 100 acquires the skill level of the vehicle occupant from the skill level acquisition unit C11 and transmits a registration request for the skill level to the server apparatus SV.

When the server apparatus SV receives the registration request for the skill level from the travel control apparatus 100, the skill level managing unit SV1 of the server apparatus SV stores identification information on the vehicle occupant (user ID) transmitted from the travel control apparatus 100 in the skill level database SV4 after associating the identification information with the authentication information for personal authentication and with skill levels. In a case where the server apparatus SV receives another acquisition request for a skill level, information registered in the skill level database SV4 is transmitted to the travel control apparatus 100 and becomes available as an initial value of the skill level.

(Other Embodiments)

Some preferred aspects have been described above by example. However, the present invention is not limited to these examples and may be partially modified without departing from the gist of the invention. For example, contents of the embodiments may be combined with other elements according to purposes or applications, and contents of one embodiment can be combined with some contents of another embodiment. In addition, each of the terms used herein are used merely for the purpose of describing the present invention; it goes without saying that the present invention is not to be limited by stringent meanings of the terms and even include equivalents of the present invention. For example, in the above embodiments, the descriptions have been given about an example in which the control state is divided into the four control states (CS1 to CS4), and the skill level is divided into the four ranks (A to D), but the control state and the skill level are not limited to this example, and the number of the control states and the number of the skill levels may be increased or decreased as appropriate. A travel environment or a travel scene (e.g., a case of traveling an urban area or a case of traveling a suburban area) may be determined based on positional information on the self-vehicle sensed by the GPS sensor S4 or the like, and based on the determined travel environment or travel scene, the skill level may be determined. The determination of the travel environment or the travel scene may be determined automatically based on the positional information on the self-vehicle, or may be set in advance on map information by a vehicle occupant (driver). For example, the vehicle occupant (driver) may set in advance an area where the vehicle occupant (driver) is accustomed to traveling, and different skill levels may be determined between a case of traveling the set area (e.g., an urban area) and a case of traveling other areas (e.g., a suburban area).

In addition, the program that implements one or more of the functions described in the embodiments may be provided to the system or the apparatus over the network or a storage medium, and one or more processors in the system or the apparatus may read and execute this program. The present invention can be implemented in such an aspect.

<Summary of Embodiments>

Configuration 1. The travel control apparatus described above is a travel control apparatus (e.g., 100) that controls automated driving travel of a vehicle by making a transition between a plurality of control states based on a surrounding environment of the vehicle, the travel control apparatus including:

a skill level acquisition unit (e.g., C11) configured to acquire a skill level of a vehicle occupant about automated driving; and a control unit (e.g., C12) configured to control the automated driving travel of the vehicle in one of the plurality of control states based on the surrounding environment of the vehicle sensed by a sensing unit (e.g., the camera CAM, the sensor S), wherein, in a case where it is determined, based on a result of sensing by the sensing unit, that a transition can be made from a first control state, one of the plurality of control states, to a second control state, which has a higher automatization rate of the automated driving travel or has a lower level of requested task to the vehicle occupant than the first control state, the control unit (C12) controls performing an automated driving function in the second control state based on the skill level.

With the travel control apparatus having Configuration 1, it is possible to control performing the automated driving function in the more advanced control state based on the skill level of the vehicle occupant. In addition, by controlling the performing of the automated driving function in accordance with the skill level, it is possible to reduce uneasiness about a more advanced automated driving function felt by a vehicle occupant who is unaccustomed with the automated driving function.

Configuration 2. The travel control apparatus (100) in the above embodiment, wherein the control unit (C12) limits the automated driving function in the second control state in a case where the skill level is equal to or lower than a threshold value, and releases the automated driving function in the second control state in a case where the skill level is higher than the threshold value.

With the travel control apparatus having Configuration 2, it is possible to control limiting or releasing the automated driving function in the second control state based on a comparison between the skill level of the vehicle occupant and the threshold value.

Configuration 3. The travel control apparatus (100) in the above embodiment wherein the skill level acquisition unit C11 acquires the skill level based on an achievement ratio of requested tasks that is calculated from an output count of the requested tasks to the vehicle occupant and a count of appropriate actions taken by the vehicle occupant with respect to the requested tasks.

With the travel control apparatus having Configuration 3, it is possible to acquire the skill level based on an evaluation result of an operation with respect to the requested task. It is possible to control performing the automated driving function in the second control state, which is the more advanced control state, based on the achievement ratio of the vehicle occupant with respect to the requested task.

In addition, in a case of a low achievement ratio, it is assumed that the vehicle occupant is overconfident about the automated driving function even in the more advanced control state, and the travel control apparatus can therefore suppress the overconfidence of the vehicle occupant about the automated driving function in advance.

Configuration 4. The travel control apparatus (100) in the above embodiment wherein the requested task to the vehicle occupant contains at least one of a request for an action relating to releasing the first control state and a request for an action relating to releasing the second control state, and the skill level acquisition unit determines whether the vehicle occupant has taken an appropriate action with respect to each request for an action and acquires the skill level in a form of an achievement ratio of the requested task that is calculated based on a result of the determination.

With the travel control apparatus having Configuration 4, it is possible to translate an evaluation of the action taken by the vehicle occupant, into the achievement ratio of the requested task when the control state is released. It is also possible to acquire the skill level based on an evaluation result of an operation with respect to the requested task.

Configuration 5. The travel control apparatus (100) in the above embodiment wherein the skill level acquisition unit (C11) acquires the skill level based on a frequency of a requested task that is output to the vehicle occupant within a preset time period.

With the travel control apparatus having any one of Configuration 3 to Configuration 5, it is possible to acquire the skill level that changes dynamically in a time-based driving history.

Configuration 6. The travel control apparatus (100) in the above embodiment wherein the skill level acquisition unit (C11) acquires the skill level based on an experience value of the vehicle occupant about driving an automated driving vehicle.

Configuration 7. The travel control apparatus (100) in the above embodiment wherein the experience value contains cumulative information about a traveling distance in which the vehicle occupant drives in the first control state or a traveling time in which the vehicle occupant drives in the first control state.

Configuration 8. The travel control apparatus (100) in the above embodiment, further including a communication unit (e.g., C3) configured to communicate a server apparatus (e.g., SV) that issues a score of a learning experience of the vehicle occupant about the automated driving function and adds a score of a skill level of the vehicle occupant stored in a database, to the issued score, wherein the skill level acquisition unit (C11) acquires the skill level of the vehicle occupant from the server apparatus (SV) via the communication unit (C3).

Configuration 9. The travel control apparatus (100) in the above embodiment, further including:

a shooting unit (e.g., the in-vehicle monitoring camera MON) disposed in such a manner as to shoot an interior of the vehicle and configured to shoot a face image of the vehicle occupant; and a processing unit (e.g., the CPU) configured to perform image processing on the face image and generate authentication information used for authenticating the vehicle occupant, wherein the skill level acquisition unit (C11) acquires the skill level of the vehicle occupant who is authenticated based on the authentication information, through communication with the server apparatus (SV) by the communication unit (C3).

Configuration 10. The travel control apparatus (100) in the above embodiment, further including an input unit (e.g., RD) configured to input authentication information that is stored in a memory of an electronic card, wherein the skill level acquisition unit (C11) acquires the skill level of the vehicle occupant who is authenticated based on the authentication information input by the input unit (RD), through communication with the server apparatus (SV) by the communication unit (C3).

Configuration 11. The travel control apparatus (100) in the above embodiment wherein the skill level acquisition unit (C11) regards the skill level acquired from the server apparatus at a time of a start of driving by the vehicle occupant starts driving, as an initial value of the skill level of the vehicle occupant, and at the time of the start of driving, the control unit (C12) controls performing the automated driving function in the second control state based on the initial value of the skill level.

Configuration 12. The travel control apparatus (100) in the above embodiment, further including: a biological information sensing unit (e.g., S6) built in a steering wheel of the vehicle and configured to sense biological information on the vehicle occupant who grips the steering wheel; and a processing unit (e.g., C1) configured to analyze a degree of a tense state of the vehicle occupant driving the vehicle, based on a result of analyzing the biological information, wherein the skill level acquisition unit (C11) acquires the skill level of the vehicle occupant based on the degree of the tense state.

Configuration 13. The travel control apparatus (100) in the above embodiment wherein the skill level acquisition unit (C11) combines the initial value of the skill level of the vehicle occupant and the skill level of the vehicle occupant acquired after a start of driving, so as to acquire an after-driving-start skill level, and after the start of driving, the control unit (C12) controls performing the automated driving function in the second control state based on the after-driving-start skill level.

Configuration 14. The travel control apparatus described above is a travel control apparatus (e.g., 100) that controls automated driving travel of a vehicle by making a transition between a plurality of control states based on a surrounding environment of the vehicle, the travel control apparatus including:

a skill level acquisition unit (e.g., C11) configured to acquire a skill level of a vehicle occupant about automated driving; and a control unit (e.g., C12) configured to control the automated driving travel of the vehicle in one of the plurality of control states based on the surrounding environment of the vehicle sensed by a sensing unit, wherein in a case where it is determined, based on a result of sensing by the sensing unit, that a transition can be made from a first control state, one of the plurality of control states, to a second control state, which has a higher automatization rate of the automated driving travel than the first control state, the control unit (C12) controls performing an automated driving function in the second control state based on the skill level.

Configuration 15. The travel control apparatus described above is a travel control apparatus (e.g., 100) that controls automated driving travel of a vehicle by making a transition between a plurality of control states based on a surrounding environment of the vehicle, the travel control apparatus including:

a skill level acquisition unit (C11) configured to acquire a skill level of a vehicle occupant about automated driving; and a control unit (C12) configured to control the automated driving travel of the vehicle in one of the plurality of control states based on the surrounding environment of the vehicle sensed by a sensing unit, wherein in a case where it is determined, based on a result of sensing by the sensing unit, that a transition can be made from a first control state, one of the plurality of control states, to a second control state, which has a lower level of requested task to the vehicle occupant than the first control state, the control unit (C12) controls performing an automated driving function in the second control state based on the skill level.

With the travel control apparatus having Configuration 14 or Configuration 15, it is possible to control performing the automated driving function in the more advanced control state based on the skill level of the vehicle occupant. In addition, by controlling the performing of the automated driving function in accordance with the skill level, it is possible to reduce uneasiness about a more advanced automated driving function felt by a vehicle occupant who is unaccustomed with the automated driving function.

Configuration 16. The travel control apparatus (100) in the above embodiment wherein the vehicle occupant includes a driver sitting in a driver's seat of the vehicle and an occupant sitting in a front passenger seat of the vehicle.

Configuration 17. The travel control apparatus (100) in the above embodiment wherein the skill level acquisition unit (C11) multiplies a skill level of the driver and a skill level of the occupant sitting in the front passenger seat by different weight coefficients, and acquires a result of adding the skill levels multiplied by the weight coefficients as the skill level of the vehicle occupant.

Configuration 18. The vehicle (e.g., 1) in the above embodiment includes the travel control apparatus (e.g., 100) according to any one of Configuration 1 to Configuration 17.

With the vehicle having Configuration 18, it is possible to provide the vehicle that can control performing automated driving functions in a more advanced control state based on a skill level of a vehicle occupant.

Configuration 19. The travel control system in the above embodiment is a travel control system that includes a travel control apparatus (e.g., 100) and a server apparatus (e.g., SV) that can communicate with the travel control apparatus (100) over a network, wherein the travel control apparatus includes the travel control apparatus according to any one of Configuration 1 to Configuration 17, the server apparatus includes a skill level database (e.g., SV4) configured to store the skill level of the vehicle occupant, and the server apparatus (SV):

when receiving a registration request for the skill level from the travel control apparatus (100), stores identification information on the vehicle occupants in the skill level database (SV4) after associating the identification information with authentication information for authenticating the vehicle occupants and with the skill level, and receiving an acquisition request for the skill level from the travel control apparatus (100), acquires a skill level that corresponds to identification information on the vehicle occupant who is authenticated based on the authentication information, from the skill level database (SV4), and transmits the skill level to the travel control apparatus.

With the travel control system having Configuration 19, it is possible to control performing the automated driving function in the more advanced control state based on the skill level of the vehicle occupant. In addition, by controlling the performing of the automated driving function in accordance with the skill level, it is possible to reduce uneasiness about a more advanced automated driving function felt by a vehicle occupant who is unaccustomed with the automated driving function.

Configuration 20. The travel control method in the above embodiment is a travel control method for controlling automated driving travel of a vehicle by making a transition between a plurality of control states based on a surrounding environment of the vehicle, the travel control method including:

acquiring (e.g., S71) a skill level of a vehicle occupant about automated driving; and controlling (S72 to S75) the automated driving travel of the vehicle in one of the plurality of control states based on the surrounding environment of the vehicle sensed by a sensing unit, wherein in a case where it is determined, based on a result of sensing by the sensing unit, that a transition can be made from a first control state, one of the plurality of control states, to a second control state, which has a higher automatization rate of the automated driving travel or has a lower level of requested task to the vehicle occupant than the first control state, performing an automated driving function in the second control state is controlled based on the skill level in the controlling (e.g., S72, S73, S74).

With the travel control method having Configuration 20, it is possible to control performing the automated driving function in the more advanced control state based on the skill level of the vehicle occupant. In addition, by controlling the performing of the automated driving function in accordance with the skill level, it is possible to reduce uneasiness about a more advanced automated driving function felt by a vehicle occupant who is unaccustomed with the automated driving function.

Configuration 21. The travel control program in the above embodiment causes a computer (e.g., CPU) to execute the steps of the travel control method according to Configuration 20.

With the program having Configuration 21, it is possible to provide the program that can control performing automated driving functions in a more advanced control state based on a skill level of a vehicle occupant.

What is claimed is:

1. A travel control apparatus that controls automated driving travel of a vehicle by making a transition between a plurality of control states based on a surrounding environment of the vehicle, the travel control apparatus comprising:

a skill level acquisition unit configured to acquire a skill level of a vehicle occupant about automated driving; and a control unit configured to control the automated driving travel of the vehicle in one of the plurality of control states based on the surrounding environment of the vehicle sensed by a sensing unit, wherein in a case where it is determined, based on a result of sensing by the sensing unit, that a transition can be made from a first control state, one of the plurality of control states, to a second control state, which has a higher automatization rate of the automated driving travel or has a lower level of requested task to the vehicle occupant than the first control state, the control unit controls performing an automated driving function in the second control state based on the skill level, wherein the skill level acquisition unit acquires the skill level based on an achievement ratio of requested tasks that is calculated from an output count of the requested tasks to the vehicle occupant and a count of appropriate actions taken by the vehicle occupant with respect to the requested tasks, the skill level based on the achievement ratio of the requested task is an index that changes dynamically in a time-based driving history, in a case where a proper action is taken for a requested task, the achievement ratio of the requested task is increased, and in a case where a proper action is not taken for the requested task, the achievement ratio of the requested task is decreased, wherein the requested task to the vehicle occupant contains at least one of a request for an action relating to enabling an operation of an automated driving function in the first control state and a request for an action relating to enabling an operation of an automated driving function in the second control state, the skill level acquisition unit determines whether the vehicle occupant has taken an appropriate action with respect to each request for an action and acquires the skill level in a form of the achievement ratio of the requested task that is calculated based on a result of the determination, in a case where the skill level of the vehicle occupant is higher than a threshold value, the control unit enables the operation of the automated driving function in the second control state, and in a case where the skill level of the vehicle occupant is equal to or lower than the threshold value, the control unit prevents the operation of the automated driving function in the second control state.

2. The travel control apparatus according to claim 1, wherein the skill level acquisition unit acquires the skill level based on a frequency of a requested task that is output to the vehicle occupant within a preset time period.

3. The travel control apparatus according to claim 1, wherein the skill level acquisition unit acquires the skill level based on an experience value of the vehicle occupant about driving an automated driving vehicle.

4. The travel control apparatus according to claim 3, wherein the experience value contains cumulative information about a traveling distance in which the vehicle occupant drives in the first control state or a traveling time in which the vehicle occupant drives in the first control state.

5. The travel control apparatus according to claim 1, further comprising a communication unit configured to communicate a server apparatus that issues a score of a learning experience of the vehicle occupant about the automated driving function and adds a score of a skill level of the vehicle occupant stored in a database, to the issued score, wherein the skill level acquisition unit acquires the skill level of the vehicle occupant from the server apparatus via the communication unit.

6. The travel control apparatus according to claim 5, further comprising:

a shooting unit disposed in such a manner as to shoot an interior of the vehicle and configured to shoot a face image of the vehicle occupant; and a processing unit configured to perform image processing on the face image and generate authentication information used for authenticating the vehicle occupant, wherein the skill level acquisition unit acquires the skill level of the vehicle occupant who is authenticated based on the authentication information, through communication with the server apparatus by the communication unit.

7. The travel control apparatus according to claim 5, further comprising an input unit configured to input authentication information that is stored in a memory of an electronic card, wherein the skill level acquisition unit acquires the skill level of the vehicle occupant who is authenticated based on the authentication information input by the input unit, through communication with the server apparatus by the communication unit.

8. The travel control apparatus according to claim 5, wherein the skill level acquisition unit regards the skill level acquired from the server apparatus at a time of a start of driving by the vehicle occupant starts driving, as an initial value of the skill level of the vehicle occupant, and at the time of the start of driving, the control unit controls performing the automated driving function in the second control state based on the initial value of the skill level.

9. The travel control apparatus according to claim 8, further comprising:

a biological information sensing unit built in a steering wheel of the vehicle and configured to sense biological information on the vehicle occupant who grips the steering wheel; and a processing unit configured to analyze a degree of a tense state of the vehicle occupant driving the vehicle, based on a result of analyzing the biological information, wherein the skill level acquisition unit acquires the skill level of the vehicle occupant based on the degree of the tense state.

10. The travel control apparatus according to claim 8, wherein the skill level acquisition unit combines the initial value of the skill level of the vehicle occupant and the skill level of the vehicle occupant acquired after a start of driving, so as to acquire an after-driving-start skill level, and after the start of driving, the control unit controls performing the automated driving function in the second control state based on the after-driving-start skill level.

11. A travel control apparatus that controls automated driving travel of a vehicle by making a transition between a plurality of control states based on a surrounding environment of the vehicle, the travel control apparatus comprising:

a skill level acquisition unit configured to acquire a skill level of a vehicle occupant about automated driving; and a control unit configured to control the automated driving travel of the vehicle in one of the plurality of control states based on the surrounding environment of the vehicle sensed by a sensing unit, wherein in a case where it is determined, based on a result of sensing by the sensing unit, that a transition can be made from a first control state, one of the plurality of control states, to a second control state, which has a higher automatization rate of the automated driving travel than the first control state, the control unit controls performing an automated driving function in the second control state based on the skill level, wherein the skill level acquisition unit acquires the skill level based on an achievement ratio of requested tasks that is calculated from an output count of the requested tasks to the vehicle occupant and a count of appropriate actions taken by the vehicle occupant with respect to the requested tasks, the skill level based on the achievement ratio of the requested task is an index that changes dynamically in a time-based driving history, in a case where a proper action is taken for a requested task, the achievement ratio of the requested task is increased, and in a case where a proper action is not taken for the requested task, the achievement ratio of the requested task is decreased, wherein the requested task to the vehicle occupant contains at least one of a request for an action relating to enabling an operation of an automated driving function in the first control state and a request for an action relating to enabling an operation of an automated driving function in the second control state, the skill level acquisition unit determines whether the vehicle occupant has taken an appropriate action with respect to each request for an action and acquires the skill level in a form of the achievement ratio of the requested task that is calculated based on a result of the determination, in a case where the skill level of the vehicle occupant is higher than a threshold value, the control unit enables the operation of the automated driving function in the second control state, and in a case where the skill level of the vehicle occupant is equal to or lower than the threshold value, the control unit prevents the operation of the automated driving function in the second control state.

12. A travel control apparatus that controls automated driving travel of a vehicle by making a transition between a plurality of control states based on a surrounding environment of the vehicle, the travel control apparatus comprising:

a skill level acquisition unit configured to acquire a skill level of a vehicle occupant about automated driving; and a control unit configured to control the automated driving travel of the vehicle in one of the plurality of control states based on the surrounding environment of the vehicle sensed by a sensing unit, wherein in a case where it is determined, based on a result of sensing by the sensing unit, that a transition can be made from a first control state, one of the plurality of control states, to a second control state, which has a lower level of requested task to the vehicle occupant than the first control state, the control unit controls performing an automated driving function in the second control state based on the skill level, wherein the skill level acquisition unit acquires the skill level based on an achievement ratio of requested tasks that is calculated from an output count of the requested tasks to the vehicle occupant and a count of appropriate actions taken by the vehicle occupant with respect to the requested tasks, the skill level based on the achievement ratio of the requested task is an index that changes dynamically in a time-based driving history, in a case where a proper action is taken for a requested task, the achievement ratio of the requested task is increased, and in a case where a proper action is not taken for the requested task, the achievement ratio of the requested task is decreased, wherein the requested task to the vehicle occupant contains at least one of a request for an action relating to enabling an operation of an automated driving function in the first control state and a request for an action relating to enabling an operation of an automated driving function in the second control state, the skill level acquisition unit determines whether the vehicle occupant has taken an appropriate action with respect to each request for an action and acquires the skill level in a form of the achievement ratio of the requested task that is calculated based on a result of the determination, in a case where the skill level of the vehicle occupant is higher than a threshold value, the control unit enables the operation of the automated driving function in the second control state, and in a case where the skill level of the vehicle occupant is equal to or lower than the threshold value, the control unit prevents the operation of the automated driving function in the second control state.

13. The travel control apparatus according to claim 1, wherein the vehicle occupant includes a driver sitting in a driver's seat of the vehicle and an occupant sitting in a front passenger seat of the vehicle.

14. The travel control apparatus according to claim 13, wherein the skill level acquisition unit multiplies a skill level of the driver and a skill level of the occupant sitting in the front passenger seat by different weight coefficients, and acquires a result of adding the skill levels multiplied by the weight coefficients as the skill level of the vehicle occupant.

15. A vehicle comprising the travel control apparatus according to claim 1.

16. A travel control system that comprises a travel control apparatus and a server apparatus that can communicate with the travel control apparatus over a network, wherein the travel control apparatus includes the travel control apparatus according to claim 1, the server apparatus includes a skill level database configured to store the skill level of the vehicle occupant, and the server apparatus:

when receiving a registration request for the skill level from the travel control apparatus, stores identification information on the vehicle occupants in the skill level database after associating the identification information with authentication information for authenticating the vehicle occupants and with the skill level, and when receiving an acquisition request for the skill level from the travel control apparatus, acquires a skill level that corresponds to identification information on the vehicle occupant who is authenticated based on the authentication information, from the skill level database, and transmits the skill level to the travel control apparatus.

17. A travel control method for controlling automated driving travel of a vehicle by making a transition between a plurality of control states based on a surrounding environment of the vehicle, the travel control method comprising:

acquiring a skill level of a vehicle occupant about automated driving; and controlling the automated driving travel of the vehicle in one of the plurality of control states based on the surrounding environment of the vehicle sensed by a sensing unit, wherein in a case where it is determined, based on a result of sensing by the sensing unit, that a transition can be made from a first control state, one of the plurality of control states, to a second control state, which has a higher automatization rate of the automated driving travel or has a lower level of requested task to the vehicle occupant than the first control state, performing an automated driving function in the second control state is controlled based on the skill level in the controlling, wherein the skill level is acquired in the acquiring based on an achievement ratio of requested tasks that is calculated from an output count of the requested tasks to the vehicle occupant and a count of appropriate actions taken by the vehicle occupant with respect to the requested tasks, the skill level based on the achievement ratio of the requested task is an index that changes dynamically in a time-based driving history, in a case where a proper action is taken for a requested task, the achievement ratio of the requested task is increased, and in a case where a proper action is not taken for the requested task, the achievement ratio of the requested task is decreased, wherein the requested task to the vehicle occupant contains at least one of a request for an action relating to enabling an operation of an automated driving function in the first control state and a request for an action relating to enabling an operation of an automated driving function in the second control state, in the acquiring, it is determined whether the vehicle occupant has taken an appropriate action with respect to each request for an action and the skill level is acquired in a form of the achievement ratio of the requested task that is calculated based on a result of the determination, in a case where the skill level of the vehicle occupant is higher than a threshold value, the control unit enables the operation of the automated driving function in the second control state, and in a case where the skill level of the vehicle occupant is equal to or lower than the threshold value, the control unit prevents the operation of the automated driving function in the second control state.

18. A non-transitory computer-readable storage medium storing a program for causing a computer to execute each step of the travel control method according to claim 17.

* * * * *